April 12, 1932. E. S. BRADFORD, JR 1,853,542
SCOURING UTENSIL
Filed Aug. 11, 1930

INVENTOR.
EDWARD S. BRADFORD, JR.
BY Chapin & Neal
ATTORNEYS.

Patented Apr. 12, 1932

1,853,542

UNITED STATES PATENT OFFICE

EDWARD S. BRADFORD, JR., OF LONGMEADOW, MASSACHUSETTS, ASSIGNOR TO SPRINGFIELD WIRE & TINSEL CO., OF SPRINGFIELD, MASSACHUSETTS, A CORPORATION OF MASSACHUSETTS

SCOURING UTENSIL

Application filed August 11, 1930. Serial No. 474,552.

This invention relates to an improved scouring utensil. It is such a scouring utensil as is made of metallic gimped cord. The latter is usually made with a twisted textile carrying strand around which is loosely twisted a metallic filament having an angular cross-section. This kind of scouring cord is old in itself.

My improvement consists in a new arrangement for such cord or its equivalent for making a scouring utensil of inexpensive and efficient form as a hand tool.

I have described in my copending application filed August 11, 1930, Serial No. 474,551, a new scouring utensil made by forming a skein of said cord under winding tension, tying the very ends of the skein, and releasing the skein from the tension. That procedure results in a fluffy ball-like mass with minimum hardness due to the anchoring operation and is very useful. There are circumstances, however, where it is desirable to clean difficult places, as corners and sharp angles, where a special formation of the utensil is needed in addition to the ball-like formation.

The present invention is designed to give an improved formation of the utensil whereby the usual cleaning operation is done by one part and the special operations where harder work is required by another part of the same utensil cooperating with the first part. There is a definite cooperation of the two parts in several particulars, as will be pointed out.

The invention can best be understood from the detailed description in connection with the annexed drawings.

Figure 1:
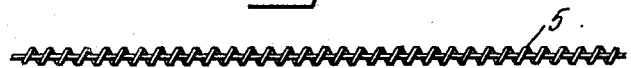
Fig. 1 is a view of the gimped cord or strand used in one of its preferred forms.
Figure 2:
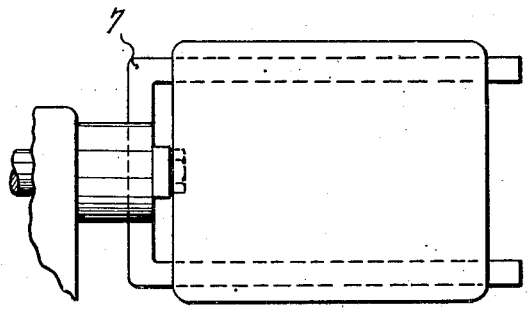
Fig. 2 is a skeleton view of a support on which a skein of the strand is formed and on which the skein is preferably tied according to my invention.

To accomplish my invention I wind a skein of a strand 5 like that in Fig. 1 on a suitable support 7, as in Fig. 2. The winding is done under the usual tension.

The twisted metal filament or strand 5 is somewhat like a weak coil spring. The winding tension in making the skein results in somewhat the same action as putting a strand of a weak coiled spring into skein form. I make particular use of these characteristics for the central part of the utensil to give that part one characteristic and for the oppositely disposed end parts of the utensil to give them other characteristics.

When the skein is formed and while it is under the winding tension I attach a binding cord or wire 9 around the skein near one end in a plane transverse to its length and spaced from the end sufficiently to tie down the skein loops into a rather tightly compacted portion. The restriction of the skein in this plane causes the outer ends of the skein loops to flare out somewhat and to form what I term an ear portion where the material of the utensil is harder because more compacted and restricted than the central portion. I preferably tie down the skein at the other end in the same fashion as shown. Then I release the skein from its winding tension.

Figure 3:
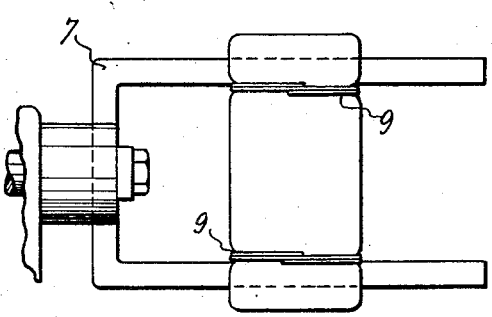
Fig. 3 is a skeleton view of the skein after tying and before it is released from its skein-forming position.
Figure 4:
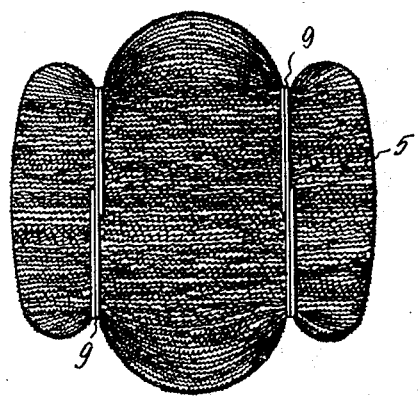
Fig. 4 is a view of my new scouring utensil formed by releasing the skein, after tying to hold the strands.

The compacted ear portions, upon the release of the tension, move closer together, due to the elasticity of the skein body. Since there is more material in the central part of the utensil between the ear portions, the portions of the strand there bow outwardly and move into a flufly, loose body. This is shown in Fig. 4 as compared with Fig. 3. In both figures the ear portions will look about the same since the compacted material at the ends is held by the binders 9. But the central portion fluffs outwardly as the tension is released and brings the ear portions closer together.

The resulting utensil has somewhat the shape of a large head with a soft and loose mass as its body portion and at each side of the head portion there is a long ear with a much harder and tightly bound mass as its body portion.

It is preferred in some instances to make the ear portions still harder by turning the skein as a whole inside out on its support, to then bind the ear portions down while the winding tension is still on the skein. This results in the longer loops of the skein being crowded in the interior of the mass. The effect is to harden the mass or body portions of the ears to a considerable degree. Since the central portion has an opportunity to move in its separate components when the tension is released, it will be relatively compacted much less than the ear portions. But it will not be quite so loose as in the first named procedure.

The utensil described has the advantage that it is cheap to make and for a given mass of material it is in an improved form for cleaning. This is particularly so in hand scouring work. The ear portions each form a good gripping means for the hand. As they are squeezed together the central portion is bowed outwardly with the length of the strand material presented on the surface in good position for scouring. The ordinary flat and curved surface scouring may be done to advantage with the utensil in this position. When it is desired to get into a corner or sharp angle and scour that, the utensil may be turned to present one of the hardened ear portions. Each such portion is tied down into a relatively hardened mass so that it can reach into the angle to be cleaned. The binder holds such mass in position to do effective scouring.

It is clear that my invention may be carried out in various equivalent ways and I intend to claim it with no restrictions except as required by the prior art. The language of the following claims is intended to be construed to include equivalents as far as the prior art permits.

What I claim is:

1. A scouring utensil formed from a skein of metallic gimped strand material, said skein being bound near its end in a plane transverse to the length of the skein with the end portion formed of compacted material and the body of the utensil beyond the end portion of loose fluffy material.

2. A scouring utensil formed of metallic gimped strand material arranged in a central body portion and two end portions, said strand material being unwoven, binding means between the central portion and each end portion, said binding means being on the outside of the utensil and positioned far enough from the end portions and with sufficient constriction on the material to hold the end portions compacted to a substantially greater degree than the material of the central portion.

In testimony whereof I have affixed my signature.

EDWARD S. BRADFORD, JR.